United States Patent [19]
Bosch

[11] 3,922,856
[45] Dec. 2, 1975

[54] CLOSED-CIRCUIT HYDROSTATIC AGGREGATE

[75] Inventor: Paul Bosch, Ludwigsburg, Germany

[73] Assignee: Robert Bosch G.m.b.H., Stuttgart, Germany

[22] Filed: July 1, 1974

[21] Appl. No.: 485,030

[30] Foreign Application Priority Data
July 24, 1973 Germany............................ 2337482

[52] U.S. Cl. ................................................. 60/464
[51] Int. Cl.² .......................................... F15B 15/18
[58] Field of Search...................... 60/455, 456, 464

[56] References Cited
UNITED STATES PATENTS
| | | | |
|---|---|---|---|
| 3,465,520 | 9/1969 | Hann ................................ | 60/464 X |
| 3,748,859 | 7/1973 | Pruvot ................................. | 60/464 |

Primary Examiner—Edgar W. Geoghegan
Attorney, Agent, or Firm—Michael S. Striker

[57] ABSTRACT

A hydrostatic drive and a hydrostatic user are connected by a closed hydraulic circuit which includes a circuit loop connecting the drive and the user and having a pressure-side branch and a suction-side branch which are connected by a loop portion. A one-way valve is interposed in each of these branches to prevent fluid flow towards the loop portion. A conduit connects the loop portion with a fluid reservoir and a first-pressure relief valve interposed in it, and a pair of relief conduits are provided, each having a second pressure-relief valve interposed in it and each communicating with one of the aforementioned branches ahead of the respective one-way valve and with the first-mentioned conduit intermediate the first-pressure relief valve and the loop portion. A fluid pump has a suction side which communicates with the reservoir and a pressure side which communicates with the first-mentioned conduit intermediate the loop portion and the first pressure-relief valve.

1 Claim, 2 Drawing Figures

CLOSED-CIRCUIT HYDROSTATIC AGGREGATE

BACKGROUND OF THE INVENTION

The present invention relates generally to a hydrostatic aggregate, that is a hydrostatic system, and more particularly to a closed-circuit hydrostatic aggregate.

Closed-circuit hydrostatic aggregates are known wherein a hydrostatic drive and a hydrostatic user are connected by a closed hydraulic circuit loop. They are provided with a pump which draws cooled hydraulic fluid from a reservoir and introduces it into the main circuit loop for cooling purposes. Any excess fluid that is being transported by the pump is shunted back into the reservoir.

These prior-art constructions require a separate valve to connect the pump with the circuit loop, so as to permit introduction of cooled hydraulic fluid into this loop. The necessity for providing such a valve, and the conduits required to connect it with the main circuit loop, makes these prior-art constructions more complicated and expensive than is desirable.

SUMMARY OF THE INVENTION

It is a general object of the present invention to provide an improved closed-circuit hydrostatic aggregate which is simpler in construction than those known from the prior art.

Another object of the invention is to provide such an aggregate which due to its simplicity is also less expensive to construct than the prior-art aggregates, and which furthermore is less subject to the possibility of malfunction.

Still an additional object of the invention is to provide such a hydrostatic aggregate which, despite the inventive advantages, will nevertheless provide for proper and effective cooling of the fluid flowing in the main circuit loop.

In keeping with the above objects, and with others which will become apparent hereafter, one feature of the invention resides in a closed-circuit hydrostatic aggregate which, briefly stated, comprises a hydrostatic drive, a hydrostatic user, and a reservoir for hydraulic fluid. A closed hydraulic circuit is provided which includes two main circuit branches, a pair of first pressure-relief valves each interposed in one of these branches and communicating with a circuit junction, a pump having a suction side communicating with the reservoir and a pressure side which discharges fluid into one of the main branches via a one-way valve with which each of the main branches is provided, a first conduit which connects the pressure side with the circuit junction, a second conduit which connects the pressure side with the reservoir, and a second pressure-relief valve which is interposed in the second conduit.

As will become clear from the detailed description of two exemplary embodiments of the invention, the construction disclosed herein eliminates the need for a separate valve and conduits which were heretofore required in the prior art to permit the introduction of hydraulic fluid by the pump into the main hydraulic circuits.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
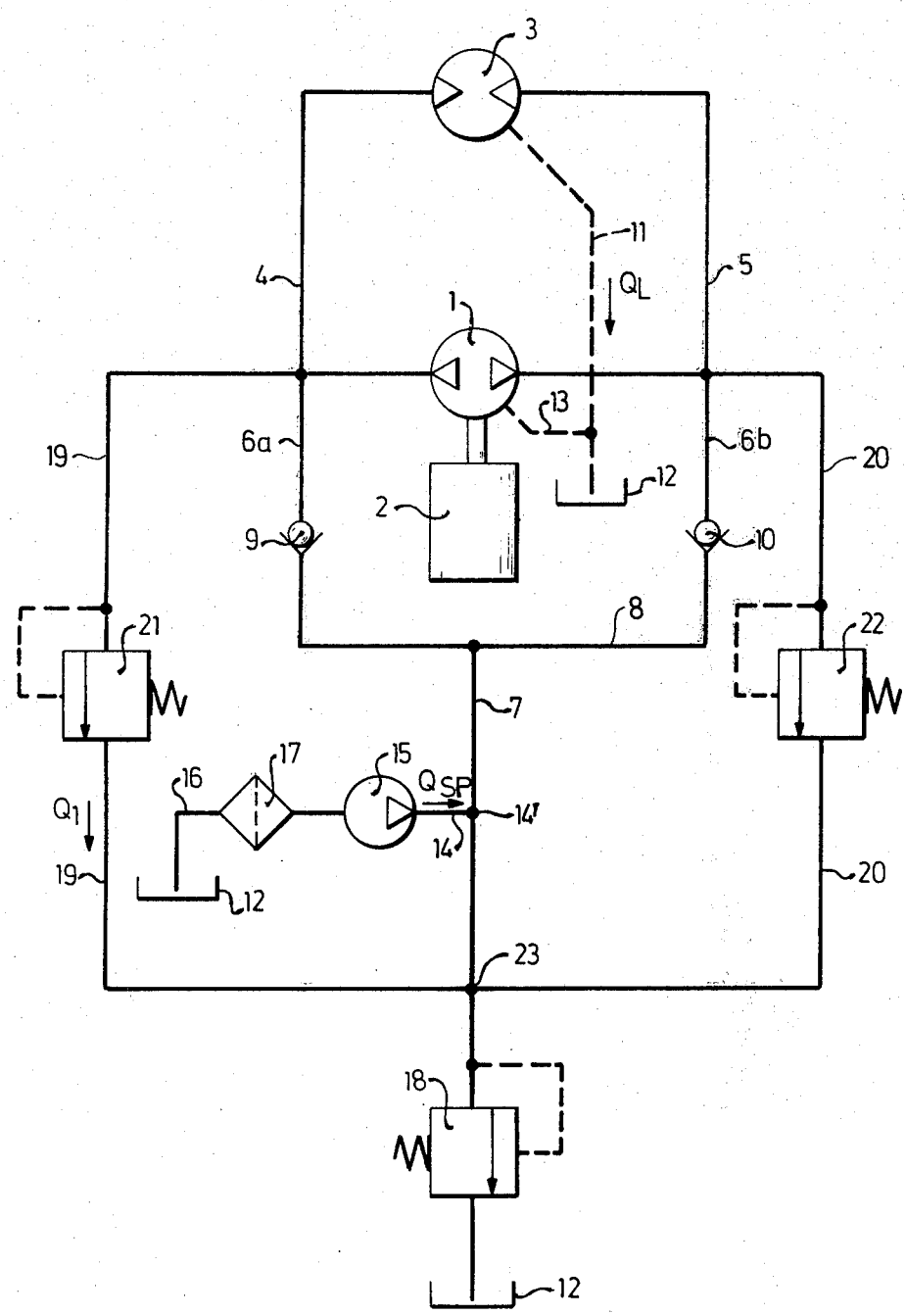
FIG. 1 is a circuit diagram, showing a first embodiment of a closed-circuit hydrostatic aggregate according to the present invention.

Referring in detail firstly to FIG. 1 of the drawing, it will be seen that in this embodiment the closed-circuit hydrostatic aggregate has a primary unit 1 and the secondary unit 3. The primary unit 1 and the secondary unit 3 are both fluid machines of which each is capable of acting as a pump or as a motor, depending upon the direction of fluid flow. Such fluid machines are very well known and require no detailed discussion, other than to point out that in this particular embodiment the primary unit 1 is driven by a drive 2, for instance an electromotor or the like. Two conduits 4 and 5 extend from the primary unit 1 to the secondary unit 3 and form a closed-circuit loop. A loop portion 6a communicates with and extends from the conduit 4 to a loop portion 8 which in turn communicates with a loop portion or conduit portion 6b that extends to and communicates with the conduit 5. Accommodated in the conduit portions 6a and 6b are respective one-way valves or check valves 9, 10 which are capable of permitting fluid flow in the direction from the loop portion 8 into the respective conduit portions 6a or 6b, but not vice versa.

A conduit 11 extends from the secondary hydrostatic unit 3 to the reservoir 12 for hydraulic fluid. The conduit 11 has been shown in broken lines to indicate that it has a different function from the other conduits; namely, it serves to conduct leakage fluid back to the reservoir 12. A similar conduit 13 conducts leakage fluid from the primary hydrostatic unit 1 into the reservoir 12.

A conduit 7 connects the loop portion 8 with the reservoir 12 also, and interposed in the conduit 7 is a pressure-relief valve 18. A pump 15 is provided which draws hydraulic fluid from the reservoir 12 via an intake line 16 and through a filter 17, and ejects it at the pressure side of the pump 15 via the conduit 14 into the conduit 7, at the junction point 14'. The liquid which is introduced at the junction point 14' is cool, having been derived from the reservoir 12.

A conduit 19 leads from the conduits 4, 6a to a junction point 23 where it joins the conduit 7 intermediate the junction point 14' and the pressure-relief valve 18. A similar conduit leads from the conduits 5, 6b to the junction point 23 and is identified with reference numeral 20. Interposed in the conduit 19 is a pressure-relief valve 21, and interposed in the conduit 20 is a further pressure-relief valve 22. It should be parenthetically noted that the pump 15 could be driven by the drive 2 which also drives the primary hydrostatic unit 1.

Assuming that the primary hydrostatic unit 1 operates as a pump and pumps pressure fluid via the conduit 4 into the secondary hydrostatic unit 3, which in this case operates as a motor, then the conduit 4 will be the high pressure conduit whereas the conduit 5, through which spent fluid flows from the unit 3 back into the primary unit 1, is the low pressure conduit.

The pump 15 draws cooled pressure fluid from the reservoir 12 and transports it into the conduit 7 from which at least a part of the thus transported liquid enters the loop portion 8 and opens the valve 10, to enter into the conduits 5, 6b. Since high pressure exists in the conduits 4, 6a, that is a pressure which is higher than that of the pressure imparted to the fluid by the pump 15, the fluid is not able to open the check valve 9. The feed pressure at which the pump feeds the liquid into the loop portion 8, is determined by the setting of the pressure-relief valve 18. The latter may, purely by way of example, be set for a pressure of 8 bar.

Both the unit 1 and the unit 3 have constant leakage losses, that is leaking pressure fluid is lost out of the circuit loop and returns via the conduits 11 and 13 into the reservoir 12. One of the functions of the pump 15 is to replenish this lost pressure fluid. However, the amount of pressure fluid that is lost in this manner is relatively small and the pump 15 cannot, for various reasons, be dimensioned so small as to transport only sufficient fluid to replenish the amount that is lost by leakage. Therefore, the excess amount of pressure fluid that is transported by the pump 15 and is not required to be replenished into the circuit via the one-way valve 10, returns via the conduit 7 and the relief valve 18 into the reservoir 12.

When a certain upper level of pressure is reached in the conduit 4, the pressure-relief valve 21 will open and permit the outflow of pressure fluid via the conduit 19 into the conduit 7 and from there via the pressure-relief valve 18 into the reservoir 12. This, of course, represents an additional loss of pressure fluid from the main circuit composed of the conduits 4 and 5, and this lost pressure fluid must be replenished by the pump 15. If the rate of feed of pressure fluid by the pump 15 is greater than the combined losses due to fluid leakage and dumping via the relief valve 21, then some of the fluid transported by the pump 15 enters via the loop portion 8 and the valves 9, 10 into the conduits 6a or 6b, and the remainder will again be shunted via the relief valve 18 into the reservoir 12. It follows from this that the fluid stream transported by the pump 15 will always branch off at the junction 14'. If the stream of fluid which is dumped via one of the valves 21 or 22 is designated as $Q_1$, and the stream of leakage fluid via the two conduits 11 and 13 is designated as $Q_L$, then pressure fluid will flow from the conduit 19 via the valve 21 to the junction point 14' if $Q_1$ plus $Q_L$ together are greater than the amount of fluid $Q_{SP}$ that is being pumped by the pump 15. On the other hand, if $Q_1$ plus $Q_L$ is smaller than $Q_{SP}$, a part of the stream of fluid pumped by the pump 15 and entering the conduit 7 at the junction point 14', will flow in the direction towards the relief valve 18. In this case, the entire stream $Q_1$ from the conduit 19 will flow to the relief valve 18 and from there into the reservoir 12.

A portion of the stream $Q_{SP}$ of fluid that is transported by the pump 15 into the conduit 7 can enter into the circuit composed of the conduits 4, 5 for cooling purposes only when the flow of fluid through one of the relief valves 21 or 22 is very small or zero. When pressure fluid flows via the respective relief valves 21, 22 towards the junction point 23, the pressure fluid undergoes substantial heating. If the amount of flow $Q_1$ is large, then this pressure fluid will undergo substantial heating and the entire stream $Q_{SP}$ of fluid that is transported by the pump 15 is then used for cooling purposes, that is admitted into the main circuit composed of the circuits 4, 5.

From what has been set forth above it will be evident that in normal operation of the aggregate the pump 15 replenishes only the leakage losses that occur via the conduits 11 and 13, whereas when dumping occurs via one of the relief valves 21 or 22 (resulting in increased loss of liquid and increased heating of the liquid) an increased amount of liquid from the pump 15 is admitted into the main circuit 4, 5 for cooling purposes and to replenish the larger liquid losses.

Figure 2:
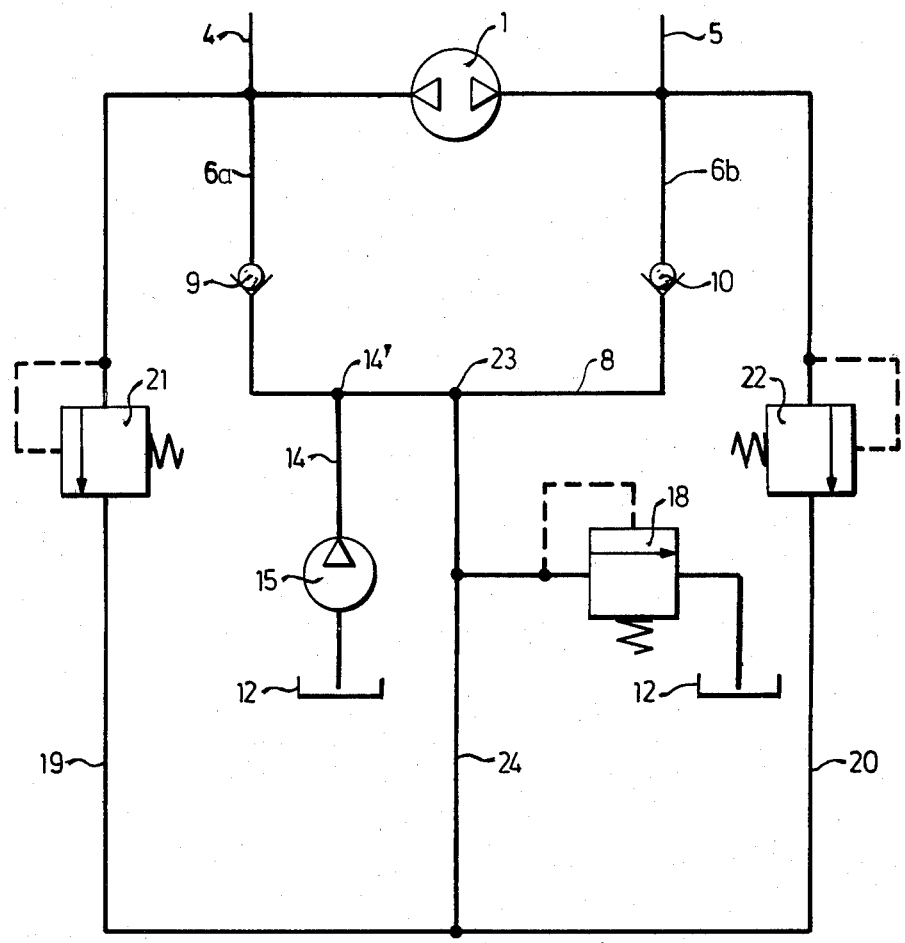
FIG. 2 is a view similar to FIG. 1, with some portions omitted which are, however, identical with corresponding portions found in FIG. 1, and illustrating a second embodiment of the invention.

The embodiment of FIG. 2 is largely the same as that of FIG. 1, and like reference numerals identify like components. The drive 2, the secondary unit 3 and the leakage conduits 11 and 13 have not been illustrated in FIG. 2, but should be understood to be present just as in FIG. 1.

Essentially, FIG. 2 differs from FIG. 1 in that the feed conduit 14 which receives the output of the pump 15 at the pressure side of the latter, communicates directly with the loop portion 8 and hence via the same with the conduits 6a, 6b. The junction point 14 is in the case located intermediate the one-way valves 9 and 10. The pressure-relief valve 18 is here connected to a conduit 24 which connects the loop portion 8—and hence the conduits 6a and 6b—with the conduits 19 and 20. The filter 17 has been omitted in FIG. 2; it should be understood that the filter 17 could be present in FIG. 2 also, but equally well the filter could be omitted in FIG. 2 as well as it could also be omitted in FIG. 1.

It should still be pointed out that both in FIG. 1 and in FIG. 2 the secondary unit 3 could operate as the pump, in which case the primary unit 1 would operate as a motor. This would not change the operation of the aggregate as set forth above, except to exchange the functions of the units 1 and 3; in all other respects, the aggregate would operate as described above.

It will be understood that each of the elements described above, or two or more together, may also find a useful application in other types of constructions differing from the type described above.

While the invention has been illustrated and described as embodied in a closed-circuit hydrostatic aggregate, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by letters Patent is set forth in the appended claims.

1. A closed-circuit hydrostatic aggregate, comprising a hydrostatic drive; a hydrostatic user; a reservoir for hydraulic fluid; a closed hydraulic circuit, including a circuit loop connecting said drive and said user and having a pressure-side branch and a suction-side branch each including a main branch portion connecting said drive and user and an auxiliary branch portion connecting the respective main branch portion with a loop portion, a one-way valve in each of said branches to prevent fluid flow towards said loop portion, said circuit further including a main conduit connecting said loop portion with said reservoir and having a first pressure-relief valve interposed in it for relieving pressure to said reservoir, and a pair of relief conduits each communicating with one of said branches and both communicating with said main conduit at a common junction point located intermediate said first pressure-relief valve and said loop portion, each of said relief conduits having a second pressure-relief valve interposed in it for relieving pressure in direction towards said junction point; and a fluid pump having a suction side communicating with said reservoir and a pressure side which communicates with said main conduit intermediate said loop portion and said junction point where said relief conduits communicate with said main conduit.

* * * * *